US006792397B2

(12) United States Patent
Yoshikawa et al.

(10) Patent No.: US 6,792,397 B2
(45) Date of Patent: *Sep. 14, 2004

(54) COUPLING PARTS INFORMATION GENERATION SYSTEM, METHOD OF GENERATING COUPLING PARTS INFORMATION, AND COMPUTER READABLE MEDIUM

(75) Inventors: Masayuki Yoshikawa, Toyota (JP); Toshiyuki Hibi, Toyota (JP); Fumiaki Nakamura, Toyota (JP)

(73) Assignee: Toyota Jidosha Kabushiki Kaisha, Toyota (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/161,952

(22) Filed: Sep. 29, 1998

(65) Prior Publication Data

US 2001/0044706 A1 Nov. 22, 2001

(30) Foreign Application Priority Data

Sep. 29, 1997 (JP) .............................................. 9-263595

(51) Int. Cl.$^7$ ........................ G06F 17/10; G06F 1/00; G06F 17/50
(52) U.S. Cl. ................. 703/2; 345/418; 703/1
(58) Field of Search ........................................ 703/2, 1

(56) References Cited

U.S. PATENT DOCUMENTS

| | | | | |
|---|---|---|---|---|
| 4,663,616 A | * | 5/1987 | Christensen | 345/681 |
| 4,858,146 A | * | 8/1989 | Shebini | 395/500.01 |
| 5,442,569 A | * | 8/1995 | Osano | 395/500.21 |
| 5,455,599 A | * | 10/1995 | Cabral et al. | 345/133 |
| 5,552,995 A | * | 9/1996 | Sebastian | 700/97 |
| 5,594,651 A | * | 1/1997 | St. Ville | 700/98 |
| 5,689,435 A | * | 11/1997 | Umney et al. | 703/1 |
| 5,701,403 A | * | 12/1997 | Watanabe et al. | 345/419 |
| 5,712,964 A | * | 1/1998 | Kamada et al. | 345/418 |
| 5,729,463 A | * | 3/1998 | Koenig et al. | 700/98 |
| 5,864,482 A | * | 1/1999 | Hazama et al. | 700/95 |
| 5,884,079 A | * | 3/1999 | Furusawa | 717/1 |

* cited by examiner

Primary Examiner—Hugh Jones
(74) Attorney, Agent, or Firm—Pillsbury Winthrop LLP

(57) ABSTRACT

In designing a plurality of parts using a CAD graphics system, appellation attributes are imparted to the constituents of the respective parts such as lines, faces, etc. The position of a weld point is then designated using a pointing device such as a mouse. Subsequently, the lines, faces, etc. constituting a portion of the parts data to be coupled at the weld point are also designated by a mouse or the like. It is possible to read the appellation attributes of the parts to be coupled at the weld point from the appellation attributes imparted to the thus-designated lines, faces, etc. Thereby, the appellation attributes of the parts are imparted to the weld point.

28 Claims, 9 Drawing Sheets

FIG.2A

DESIGN PART A

20

ALL THE LINES AND FACES ARE PROVIDED WITH AN APPELLATION ATTRIBUTE "PLATE A"

DESIGN PART B

30

APPELLATION "PLATE B"

DESIGNATE

DESIGNATE WELD POSITIONS

SPECIFY

DESIGNATE PORTIONS OF THE DATA ON DESIGNED PARTS A AND B RESPECTIVELY, AND THE INFORMATION OF "PLATE A" AND "PLATE B" WILL BE IMPARTED TO THE WELD POINT ELEMENT.

| | INFORMATION ON PART NUMBERS OF THE COUPLING PARTS | | |
|---|---|---|---|
| | 1 | 2 | 3 |
| WELD POINT 1 | PLATE A | PLATE B | ------ |

OPERATION OF IMPARTING THE INFORMATION ON THE NAMES OF COUPLING PARTS TO THE DATA ON THE WELD POINT

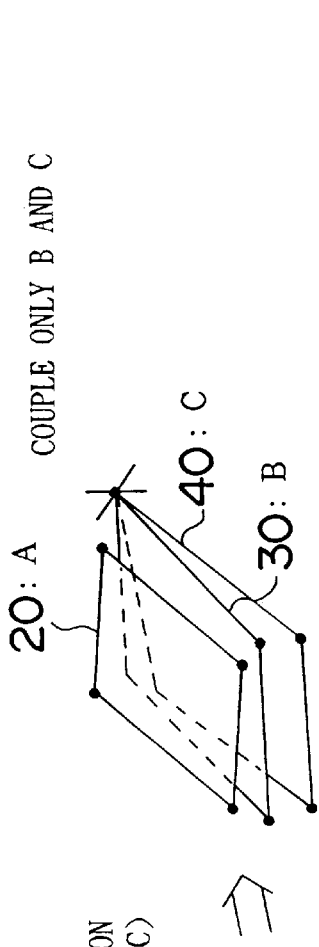
FIG.6A
WELD POINT ELEMENT
(PROVIDED WITH INFORMATION ON B AND C)
FINITE ELEMENT
(RECTANGULAR SHELL ELEMENT)
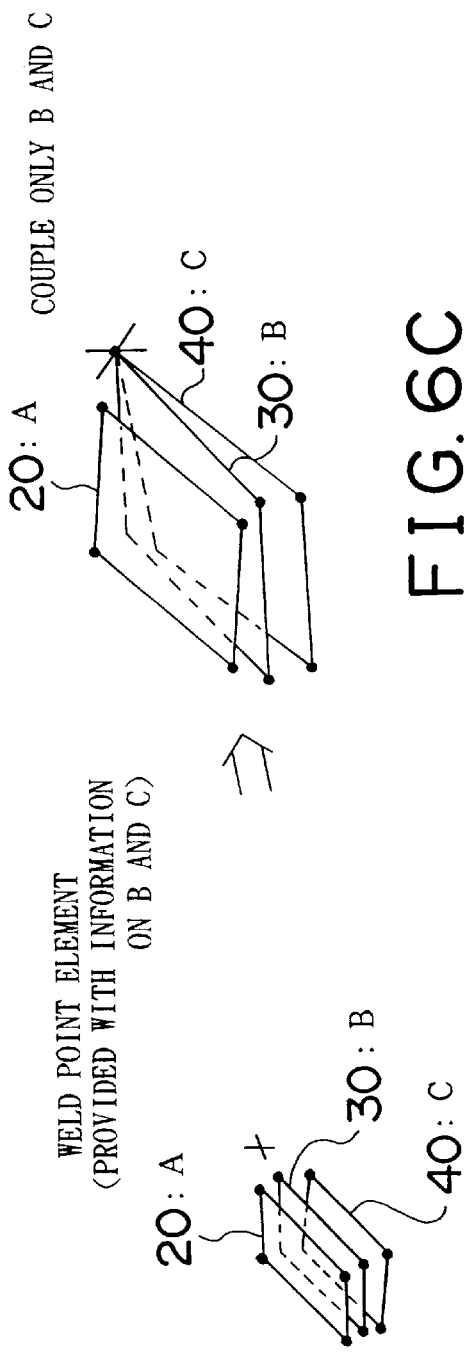
FIG.6B  COUPLE ONLY B AND C
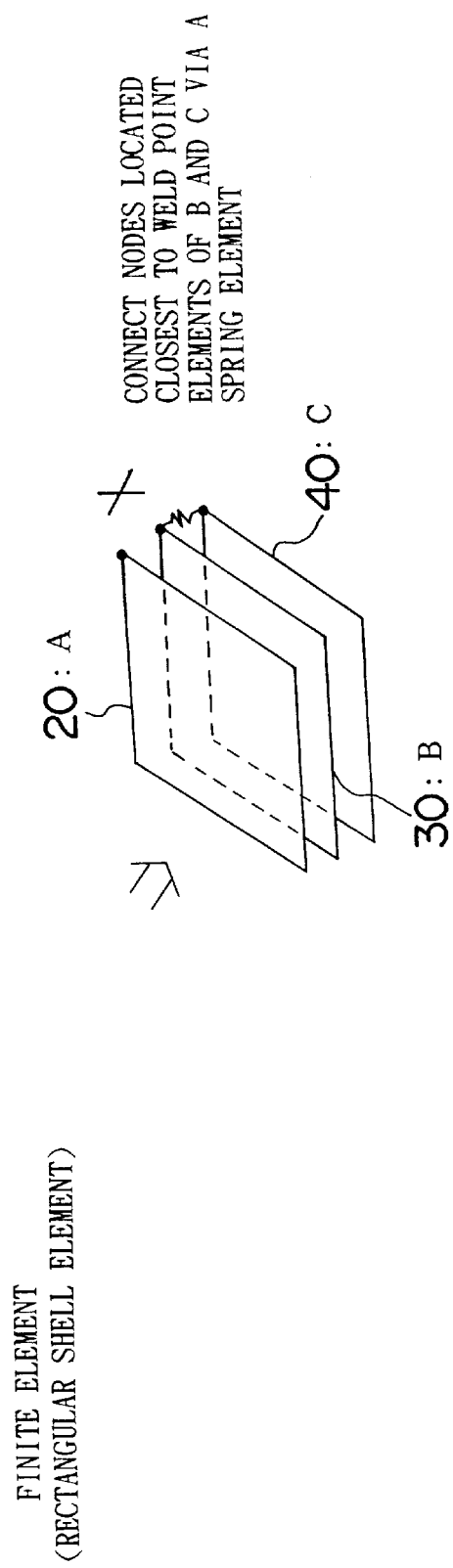
FIG.6C  CONNECT NODES LOCATED CLOSEST TO WELD POINT ELEMENTS OF B AND C VIA A SPRING ELEMENT

FINITE ELEMENTS IN THE FIELD OF CAE

CONSTITUENTS IN THE FIELD OF CAD

COUPLING PARTS INFORMATION GENERATION SYSTEM, METHOD OF GENERATING COUPLING PARTS INFORMATION, AND COMPUTER READABLE MEDIUM

INCORPORATION BY REFERENCE

The disclosure of Japanese Patent Application No. HEI 9-263595 filed on Sep. 29, 1997 including the specification, drawings and abstract is incorporated herein by reference in its entirety.

BACKGROUND OF THE INVENTION

1. Field of the Invention

The present invention relates to the use of a CAD (Computer Aided Design) system for specifying information related to parts to be coupled at a weld point. More specifically, the invention is directed to the manipulation and joining of data to streamline the use of a CAD system for inputting and specifying such data.

2. Description of the Related Art

A CAD system is widely employed to design motor vehicles and various machines. CAD data constructed by the CAD system is widely used in production processes after the design has been completed.

In utilizing CAD data for a production process of welding, there are many cases where the constructed CAD data include what is called a "weld point element" (hereinafter referred to simply as a weld point), which represents a point of spot welding. A welding robot or the like used in the production process retrieves necessary information imparted to the weld point in the CAD data and performs a welding operation using the information.

As described, information required to perform the welding operation is imparted to the weld point. The information includes a position of the weld point, an orientation of a weld surface (a normal vector thereof), a direction in which a welding gun of the welding robot enters, and the like. In addition, there is information describing a welding condition that depends on the material or total thickness of plate parts to be welded. This welding condition information must also be imparted. During known production processes, a welding robot carries out its welding operations using such information.

CAD data are also utilized in conducting structural analysis (an investigation on collision, strength, rigidity etc.) of a structural body such as a motor vehicle. In such a case, it has been proposed to utilize the information on the weld point as included in the CAD data. For example, the information on the position of the weld point, the orientation of the weld surface and the like as imparted to the weld point is used to couple those parts to be welded via the weld point, whereby a new finite element model is constructed. The CAD system automatically performs such a coupling operation, whereby it becomes possible to conduct structural analysis under the conditions that better match a real mechanical structure.

Various methods have been proposed to couple the parts. According to one method, nodes of the respective parts are displaced to the weld position to generate a shared node. According to another method, a node is assigned to the weld point and a finite element is provided to connect the node of the weld position with the nodes of the respective parts.

In this manner, there is proposed a method wherein the information imparted to the weld point included in the CAD data is used to automatically couple the parts via a predetermined finite element. However, this method encounters a case where the parts to be coupled cannot be selected accurately.

This is because the information on the coupling parts is not imparted to the weld point. In the CAD system according to the conventional art, there are many cases where the information on the parts to be coupled by means of welding is inputted as what is called an annotation.

On the other hand, various systems have been proposed to automatically couple those parts constituting a machine based on the information on a weld point. As has been described, however, the information on the coupling parts is not imparted to the weld point. Therefore, it is necessary to infer coupling parts based on the information on the given weld position. In general, the CAD system capable of automatically coupling parts in the thus-described manner widely adopts either a method wherein the nodes located in the vicinity of the weld position are automatically coupled via a finite element or a method wherein those nodes are coupled via a shared node.

According to a method of automatically coupling those nodes located close to the weld point, in the case where three parts A, B and C having flanges are superimposed on one another and only the parts B and C are welded to each other as shown in FIG. 9, it is difficult for the CAD system to accurately select parts to be coupled. FIG. 9 is a sectional view illustrating the angle part A, the plate part B and the angle part C that are superimposed on one another. Referring to FIG. 9, although the parts B and C are welded to each other at a weld point 10, the part A is welded to neither the part B nor the part C. In a machine of such a structure, if the conventional CAD system is used to automatically couple the nodes of the part models located close to the weld point 10 via a finite element, there is even a possibility of the part A, which is actually not supposed to be coupled to any other part, being coupled to some other part. Thus, there is raised a problem of inaccuracy in selecting coupling parts.

To prevent the part A from being automatically coupled via the finite element, it is desired that the weld point 10 have associated with it the appropriate information on the coupling parts. That is, the information that the parts B and C are coupled at the weld point 10 is newly imparted to the weld point 10. Thus, it becomes evident which parts are to be coupled at the weld point 10. Since it is clearly indicated that the parts B and C are to be automatically coupled, the part A is prevented from being automatically coupled by mistake.

However, a motor vehicle, for example, has thousands of weld points where welding should be carried out. Hence, if an attempt is made to provide all the weld points with the information on the coupling parts, the number of processes for inputting such information increases especially at a designing stage, which causes a problem of an increase in development costs. More specifically, the information on the coupling parts represents the part names of the coupling parts. That is, the part names of the parts B and C are imparted to the weld point 10. These part names have already been imparted to the finite elements that constitute the respective parts in the CAD system. For example, the constituents of the part B such as lines, faces etc. should be provided with the information that those constituents belong to the part B. Thus, the operation of inputting the part names has already been carried out with respect to the constituents such as lines, faces etc.

Accordingly, if the part names of the coupling parts are to be inputted to the weld point 10 again, it follows that the operation of inputting the part names such as the parts B and C is performed a plurality of times. Consequently, the inputting operation becomes considerably bothersome.

The term "constituent" as used in the field of CAD corresponds to the term "finite element" in the field of CAE (Computer Aided Engineering). FIGS. 10A and 10B are explanatory views illustrating a relationship in terminology between CAD and CAE. Referring to those drawings, "nodes" and "sides" are called "finite elements" in the field of CAE (See FIG. 10A), whereas "lines", "circles", "faces", "arcs", "splines" and the like are equivalent to the finite elements and called "constituents" in the field of CAD (See FIG. 10B).

When CAD data are used to conduct structural analysis, it is necessary to couple the parts of a finite element model based on the weld point. This is because such a coupling operation allows structural analysis to be conducted with precision. From the standpoint of model construction, it is efficient to simultaneously connect all the weld points via finite elements after preparation of part models corresponding to, for example, a motor vehicle. Thus, also from the standpoint of model construction, a method of inputting to a weld point the information on parts to be coupled at the weld point, such as part names, has been sought.

SUMMARY OF THE INVENTION

The present invention has been made in view of the aforementioned problem. It is thus an object of the present invention to provide a method of efficiently inputting to a weld point the names of parts to be coupled at the weld point in addition to a welding condition, and to provide a CAD system capable of conducting structural analysis with ease based on the inputted CAD data.

To solve the aforementioned problem, the present invention provides a method of constructing parts-coupling data for coupling at least two pieces of parts data to one another in a CAD system, including a coupling position designating step of designating a coupling position for the parts data and a coupling parts specifying step of specifying the parts data to be coupled at the coupling position designated in the coupling position designating step.

Since the aforementioned method includes the step of specifying the coupling parts, it is possible to couple the parts data, to which the information on the coupling parts have been imparted.

In addition, the method may include a finite element model constructing step of constructing a finite element model that represents a set of coupling parts obtained as a result of carrying out the specifying step one or more times. In this case, since the finite element model is automatically constructed, it is possible to make a calculation of strength or the like in accordance with an actual apparatus.

Another feature of the present invention is that the finite element model constructing step may include a step of connecting nodes of finite elements belonging to the coupling parts via a two-dimensional finite element such as a rigid-body element, a beam element or the like.

In this case, since only the parts to be coupled are connected via the two-dimensional finite element, it is possible to construct a finite element model with precision.

The finite element model constructing step may also include a step of connecting nodes of finite elements belonging to the coupling parts via a shared node. Also in this case, only the parts to be coupled are connected via the shared node. Thus, it is possible to construct a finite element model with precision.

Still another feature of the present invention is that the method may include a coordinate designating step of designating a coordinate of a coupling point representing the coupling position.

In this case, since the coordinate of the coupling point is designated, it is possible to accurately specify parts to be coupled based on the thus-designated coordinate.

Furthermore, the present invention also relates to a computer readable medium storing therein a program for realizing the aforementioned respective methods.

Furthermore, the present invention also relates to a system for realizing the aforementioned respective methods.

BRIEF DESCRIPTION OF THE DRAWINGS

The foregoing and further objects, features and advantages of the present invention will become apparent from the following description of preferred embodiments with reference to the accompanying drawings, wherein:

FIGS. 2A through 2D are explanatory views illustrating the operation of designating the information on parts to be coupled at a weld point in the CAD graphics system according to the embodiment of the present invention;

FIGS. 6A through 6C are explanatory views illustrating the operation of connecting nodes of finite elements included in the respective parts based on the parts information imparted to the weld point;

DETAILED DESCRIPTION OF THE PREFERRED EMBODIMENTS

Preferred embodiments of the present invention will be described hereinafter with reference to the drawings.

First, a CAD graphics system according to a first embodiment of the present invention will be described. This CAD graphics system is capable of imparting to a weld point, data indicative of parts to be coupled at the weld point.

Figure 1:
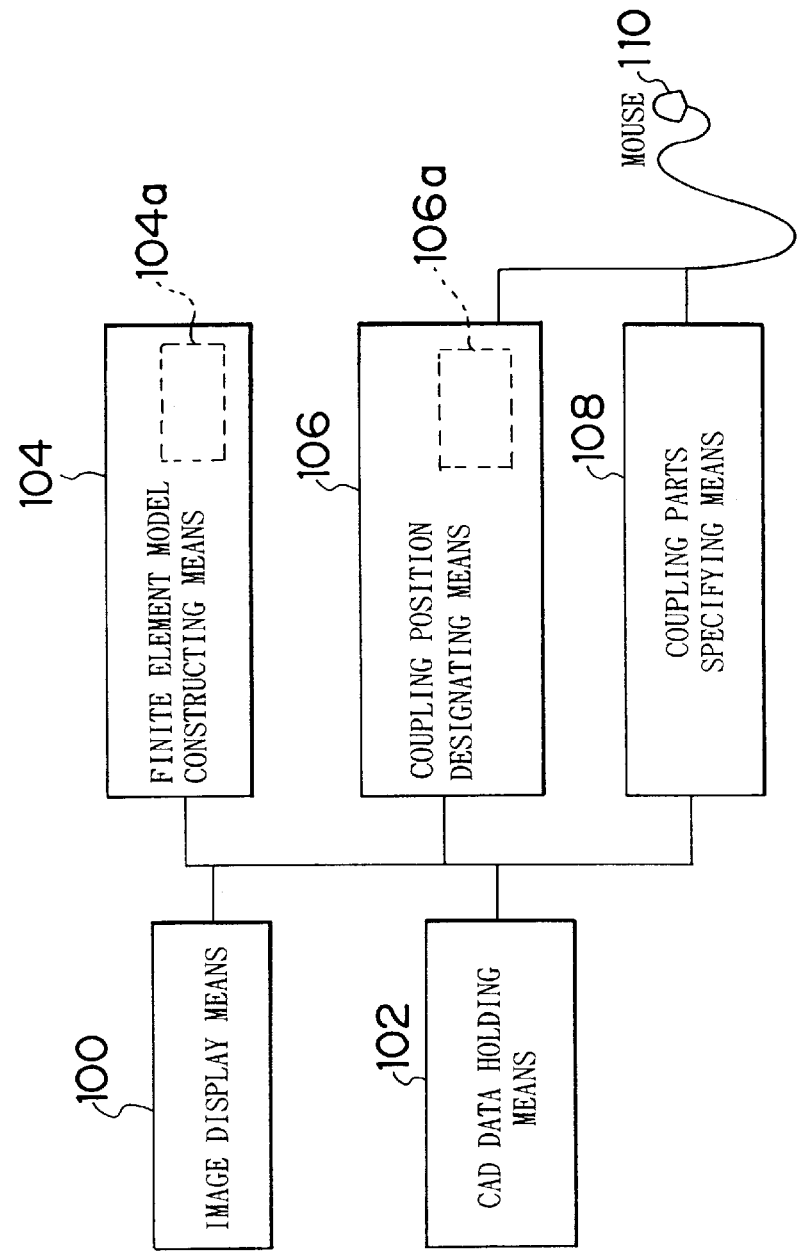
FIG. 1 is a functional block diagram illustrating a functional structure of a CAD graphics system according to an embodiment of the present invention.

FIG. 1 is a functional block diagram representing functions that are characteristic of the CAD graphics system according to the present embodiment. A display 100 indicates CAD data to a user, using a CRT or the like. A CAD data storage 102 is a memory, constituted by a hard disk or the like, for storing CAD data. As will be described later, CAD data of various data structures are stored in the CAD data storage 102. Finite element model constructing means 104 constructs CAD data. The operation of the finite element model constructing means 104 will be described later in detail. The finite element constructing means 104 includes a coupling means 104a, the operation of which will also be described later.

A coupling position designating means 106 designates a weld point and deals with signals from a pointing device such as a mouse 110, a writing tablet, or other such device. The finite element model constructing means 104 includes a coordinate designating means 106a. The operation of the coordinate designating means 106a will also be described later.

As will be described later, coupling parts specifying means 108 specifies parts to be coupled at a weld point and deals with signals from a pointing device such as a mouse 110.

Except for the display 100 and the CAD data storage 102, the various devices shown in FIG. 1 are preferably realized by a programmed computer. Of course, they could also be constructed as dedicated circuits in various ways and manners.

FIGS. 2A through 2D indicate how a screen of the CAD graphics system of the present embodiment is operated. Referring to FIG. 2A, a user of this system first designs a part 20. The part 20 is composed of finite elements including lines and faces. The lines, faces etc. constituting the part 20 are all accompanied by an appellation attribute "PLATE A".

Referring next to FIG. 2B, the user designs a part 30, which is also composed of finite elements including lines and faces. The lines, faces etc. constituting the part 30 are all accompanied by an appellation attribute "PLATE B".

As can be seen from FIG. 2C, the user uses a pointing device such as a mouse or a light-pen to designate positions (coordinates) of weld points, which correspond to positions where spot welding is carried out. In an example shown in FIG. 2C, the parts 20 and 30 are spot-welded to each other at three locations. Concrete positions of the weld points are marked with "x". Those weld points are designated after causing the CAD graphics system to transition to a "designation" mode. After the CAD graphics system has entered the designation mode, the user specifies, using mouse 110 or the like, specific positions (coordinates) of the weld points. The user can cause the CAD system to transition to the designation mode, for example, by selecting the designation mode from a pull-down menu or the like. In the example shown in FIG. 2C, the sign "DESIGNATE" on the screen indicates that the designation mode for designating positions of weld points has been entered.

The thus-described designating operation corresponds to a coupling position designating step of the present invention.

In the presently preferred embodiment, the functions of the CAD graphics system are programmed, and the aforementioned designating operation corresponds to a coupling position designating function of the present invention.

The user then selects a transition to a "specific mode", also from a pull-down menu or the like. In response to such selection, the CAD graphics system makes a transition to the specific mode. After the transition to the specific mode has been made, the user uses a pointing device such as a mouse to designate a portion of the respective data on design parts to be coupled at the weld points. For example, as can be seen from FIG. 2D, the parts 20 and 30 are coupled to each other at the weld points. Thus, using the mouse or the like, the user designates portions of the data on the design parts 20 and 30. Consequently, the information of "PLATE A" and "PLATE B" is imparted to those weld points designated in FIG. 2C.

It is significant that a pointing device such as a mouse is used to designate a portion of parts data so as to impart appellation attributes thereof to each weld point. By designating a portion of the data on coupling parts, the appellation attributes imparted to that portion of the data are read. Furthermore, the appellation attributes of the parts 20 and 30 or the like can be read therefrom. Finally, the thus-read appellation attributes of the parts 20 and 30 are imparted as information to the weld points shown in FIG. 2C.

The operation of designating parts data by means of a mouse corresponds to a coupling parts specifying step of the present invention. The functions of the CAD graphics device according to the present embodiment are programmed, and the aforementioned operation of designating parts data by means of a mouse corresponds to a coupling parts specifying function of the present invention.

The data on parts to be coupled at each weld point (i.e. the data on lines, faces etc. constituting those parts) are directly designated, whereby the appellation attributes imparted to those lines, faces etc. are imparted to the weld point. The appellation attribute of a certain part corresponds to the name of a group of lines, faces etc. representing a shape of the part.

Figures 3, 4:
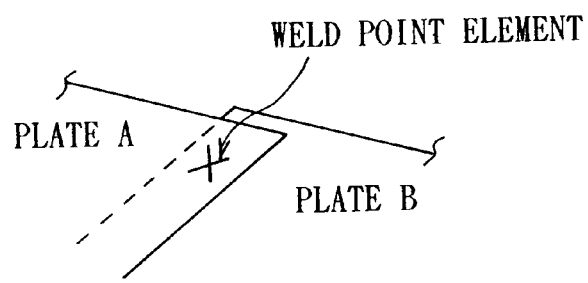
FIG. 3 is an explanatory view illustrating a weld point where two parts are coupled to each other.
FIG. 4 is an explanatory view of the data showing how the information on part numbers of two coupling parts is imparted to the weld point as shown in FIG. 3.

FIG. 4 illustrates contents of the parts information imparted to a weld point by the CAD graphics device according to the present embodiment. For example, FIG. 4 shows a case of a weld point 1, wherein signs "PLATE A" and "PLATE B" are indicated as the information on part numbers of the coupling parts. The information on the part numbers is imparted to the weld point as shown in FIG. 3. As is apparent from FIG. 3, the weld point 1 is a point where the "PLATE A" and the "PLATE B" are coupled to each other. As can be seen from FIG. 4, there are two parts to be coupled at the weld point shown in FIG. 3 as an example. However, in general, there are also cases where more than two parts are coupled to one another. In such cases, the information on more than three part numbers may be required.

Figure 5:
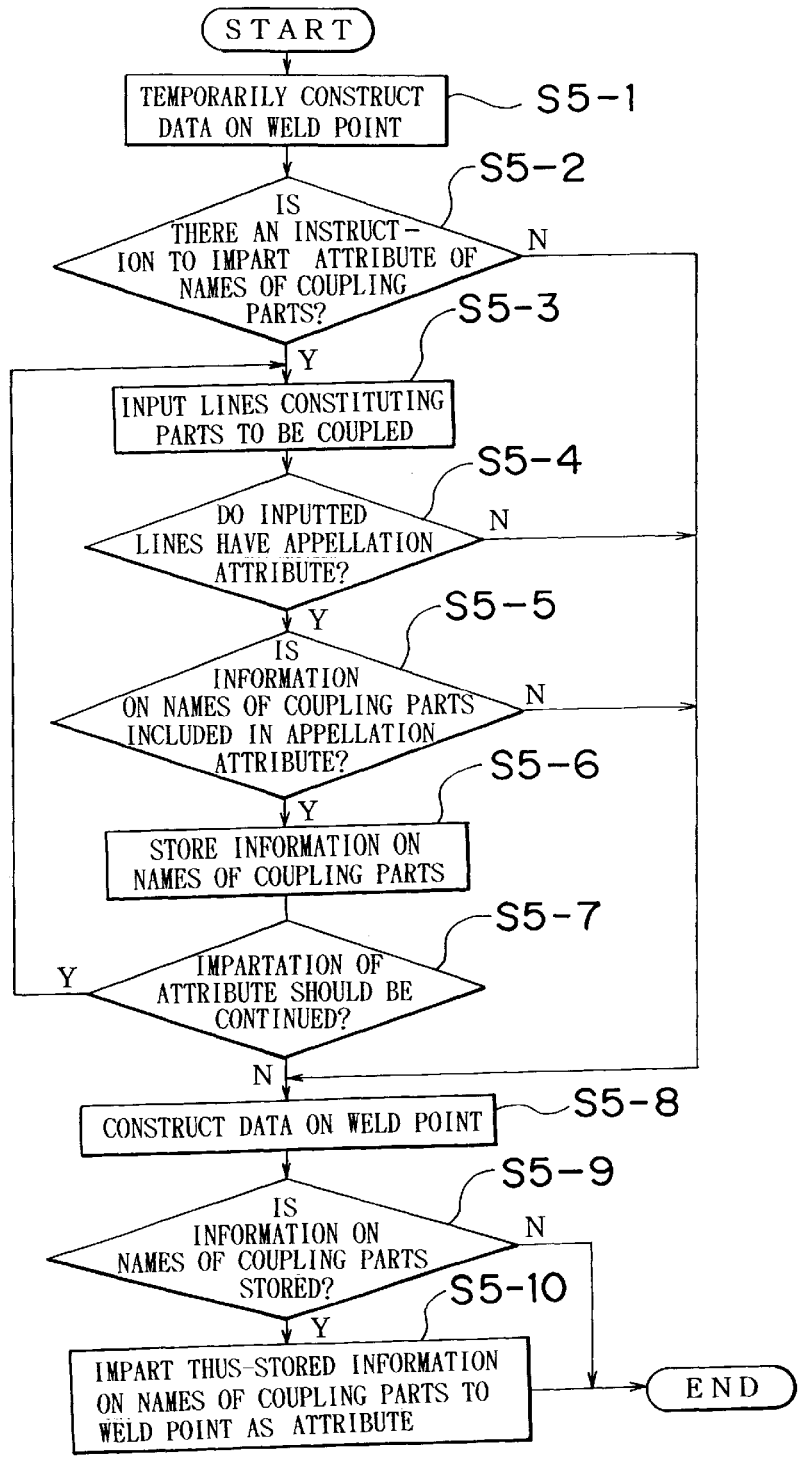
FIG. 5 is a flowchart illustrating the operation of imparting the information on parts to be coupled at the weld point.

The operation of the thus-constructed CAD graphics device will now be described in detail based on a flowchart. FIG. 5 illustrates the flowchart showing the operation of the CAD graphics system.

First of all, the data on a weld point are temporarily constructed in step S5-1. The processing in step S5-1 corresponds to the operation of designating weld positions in FIG. 2C. At this stage, the data on the weld position are temporarily constructed instead of being formally registered.

In step S5-2, it is then checked whether or not there is an instruction to impart appellation attributes of coupling parts. In other words, it is checked whether or not an instruction to set a specific mode has been issued. If there is no instruction to impart the appellation attributes of coupling parts in step S5-2, the aforementioned data on the weld point are formally constructed (step S5-8). The formal construction of the data on the weld point will be described later. On the other hand, if there is an instruction to impart the appellation attributes of coupling parts in step S5-2, the operation then proceeds to step S5-3. The case where there is an instruction to impart the attributes indicates that the user has designated a specific mode in FIG. 2D.

As has been described with reference to FIG. 2D, the lines constituting parts to be coupled at those weld points are input in step S5-3. As has been described with reference to FIG. 2D, the input operation of those lines is carried out using a pointing device such as a mouse, or the like.

In step S5-4, it is then checked whether or not the lines input in the aforementioned step (the lines designated by a mouse or the like) have appellation attributes. If those lines have no appellation attributes, it is determined that there are no parts to be coupled and the operation proceeds to the formal construction of the data on the weld point (step S5-8).

On the other hand, if appellation attributes are imparted to the inputted lines, it is checked in step S5-5 whether or not the appellation attributes include the information on names of coupling parts. As previously mentioned, the appellation attribute is the name of a group such as "PLATE A". More specifically, the appellation attribute corresponds to the name of a coupling part, such as "PART A". In addition to concrete parts, various three-dimensional objects are constructed in the CAD graphics system. However, since there are many cases where concrete names of those objects have not been determined yet, group names are generally used in the CAD graphics system instead of the concrete names of parts. A predetermined table is used to clarify a correspondence between the group names and the part names.

Although the present embodiment employs the names of groups concerning coupling parts as the information on a weld point, the names of parts themselves can also be employed.

If the appellation attributes do not include the information on the names of coupling parts in step S5-5, it is determined that there are no parts to be coupled and the operation then proceeds to an ultimate processing of constructing the data on the weld point (step S5-8).

If the appellation attributes include the information on the names of coupling parts in step S5-5, the information on those part names is stored in step S5-6. As is the case with the temporary construction of the data on the weld point, the information on those part names is also temporarily stored.

In step S5-7, it is then determined whether or not the impartation of the appellation attributes should be continued. The impartation of an appellation attribute represents the act of imparting the information on parts to be coupled at a certain weld point to the data on the weld point. Such determination can be made by checking whether or not the specific mode (see FIG. 2D) is in continuation. As has been described with reference to FIG. 2D, while the specific mode is set, all the lines designated by a pointing device such as a mouse are handled as a portion of the data on coupling parts. As long as the specific mode is maintained, it is determined that the impartation of attributes should be continued, and the operation makes a transition from step S5-7 to the aforementioned step S5-3.

On the other hand, if it is determined in step S5-7 that the impartation of attributes should be terminated, the operation proceeds to an ultimate process of constructing the data on the weld point in step S5-8.

In step S5-9, it is then checked whether or not the information on names of coupling parts is temporarily stored in the thus-constructed data on the weld point. Such temporary storage of the information is carried out in the aforementioned step S5-6. If the information on those part names is stored, the information on the names of coupling parts as stored in step S5-10 is imparted to the weld point as attributes. On the other hand, if the information on the names of coupling parts is not stored, no attributes are imparted to the weld point.

The information on the names of coupling parts is temporarily recorded in predetermined storage means inside the CAD graphics system. For example, a main storage device such as a semiconductor memory is used.

The formal registration of the information on the names of coupling parts is also carried out in predetermined storage means inside the CAD graphics system. In this case, it is possible to use the same storage means as used in temporarily recording the information. It is also preferable to use non-volatile storage means such as a hard disk.

As has been described hitherto, the first embodiment of the present invention makes it possible to impart to a weld point, with a simple operation, the information on parts to be coupled at the weld point. By using the CAD graphics system according to the first embodiment of the present invention, it is possible to obtain the data composed of those data on a weld point to which the information on part numbers of coupling parts is imparted. Such data make it easy to comprehend which parts are to be coupled at each weld point during a production process. In conducting structural analysis, it is also possible to make a calculation of strength or the like with higher precision using the data on the coupling parts.

The aforementioned first embodiment provides a CAD graphics system that is capable of imparting to a weld point the information on parts to be coupled at the weld point. Thus, the CAD graphics system can be used to obtain CAD data in which the information on the coupling parts is stored.

If a set of finite elements representing a new structure obtained as a result of a coupling (welding) operation is constructed based on the CAD data composed of parts data that have been imparted to a weld point, and if the CAD data including the thus-constructed data are used to make a calculation of strength or the like, it is possible to design an apparatus with higher precision.

A second embodiment of the present invention will now be described.

The second embodiment relates to a method of using a set of finite elements to construct parts that have been coupled based on the information on parts to be coupled at a weld point. The second embodiment also relates to a CAD graphics system adopting such a method.

FIGS. 6A through 6C are explanatory views showing a method of constructing the data on coupling parts according to the second embodiment of the present invention.

First of all, FIG. 6A illustrates three plate parts superimposed on one another, i.e. parts 20, 30 and 40. It is to be noted, however, that FIG. 6A illustrates only one finite element constituting each of the parts. That is, although the part 20 is defined as a set of rectangular shell elements, FIG. 6A illustrates only one of the rectangular shell elements as a finite element. The part 20 is actually composed of a multitude of finite elements as shown in FIG. 6A. FIG. 6A also illustrates a weld point element, which is a weld point marked with x.

In the present embodiment, the information on the parts 30 and 40 is imparted to the weld point element. The impartation of the information is carried out in the same manner as in the first embodiment. In other words, the weld point shown in FIG. 6A represents a point where the parts 30 and 40 are welded to each other.

In this example, shown in this second embodiment, parts 30 and 40 are coupled to each other based on the information on those parts imparted to the weld point element. The parts 30 and 40 can be coupled to each other in accordance with a number of methods.

According to one such method, nodes of finite elements located close to the weld point are displaced so as to coincide with each other, whereby one (shared) node is generated. FIG. 6B illustrates this method. Since only the information on the parts 30 and 40 is imparted to the weld point element, those nodes which are located close to the weld point and belong to either the part 30 or the part 40 are selected. The thus-selected nodes are integrated into one shared node.

In the second embodiment as shown in FIG. 6B, since the information on the part 20 is not imparted to the weld point, the nodes of the part 20 are not regarded as objects to be coupled. In this manner, according to the second embodiment of the present invention, only the nodes of parts to be welded at a certain weld point are displaced to generate one shared node. Thus, the CAD graphics system can automatically construct a model of, as it were, a new part generated by welding those parts to each other at the weld point.

As has been described hereinbefore, there is proposed a method or a program for displacing all the nodes located close to a certain weld point to that weld point so as to generate one shared node. However, this kind of method cannot ensure precise construction of coupling parts, because there is a possibility of even the nodes of the part 20 being integrated into the shared node. In the present embodiment, the information on parts to be coupled at a certain weld point is imparted to that weld point. Thus, only necessary parts can be coupled to one another based on such information. Consequently, it is possible to construct a model of, as it were, a new part generated by welding those necessary parts to one another, and to conduct structural analysis with higher precision.

Although the nodes of the finite elements are integrated into one shared node in FIG. 6B, it is also preferable to use a two-dimensional finite element so as to connect two nodes. For example, FIG. 6C illustrates a spring element connecting a node of the part 30 with a node of the part 40. If the spring constant of the spring element has been changed, for example, by replacing a material thereof, it is possible to construct a model that better matches a real object.

Although FIG. 6C illustrates an example of a spring element for connecting nodes, it is also preferable to connect the nodes via a beam element or the like.

The CAD graphics system according to the second embodiment of the present invention constructs coupling parts, for example, by automatically generating a finite element for coupling the parts based on the information on the coupling parts as imparted to weld point elements, or by displacing nodes so as to generate a shared node.

Figure 7:
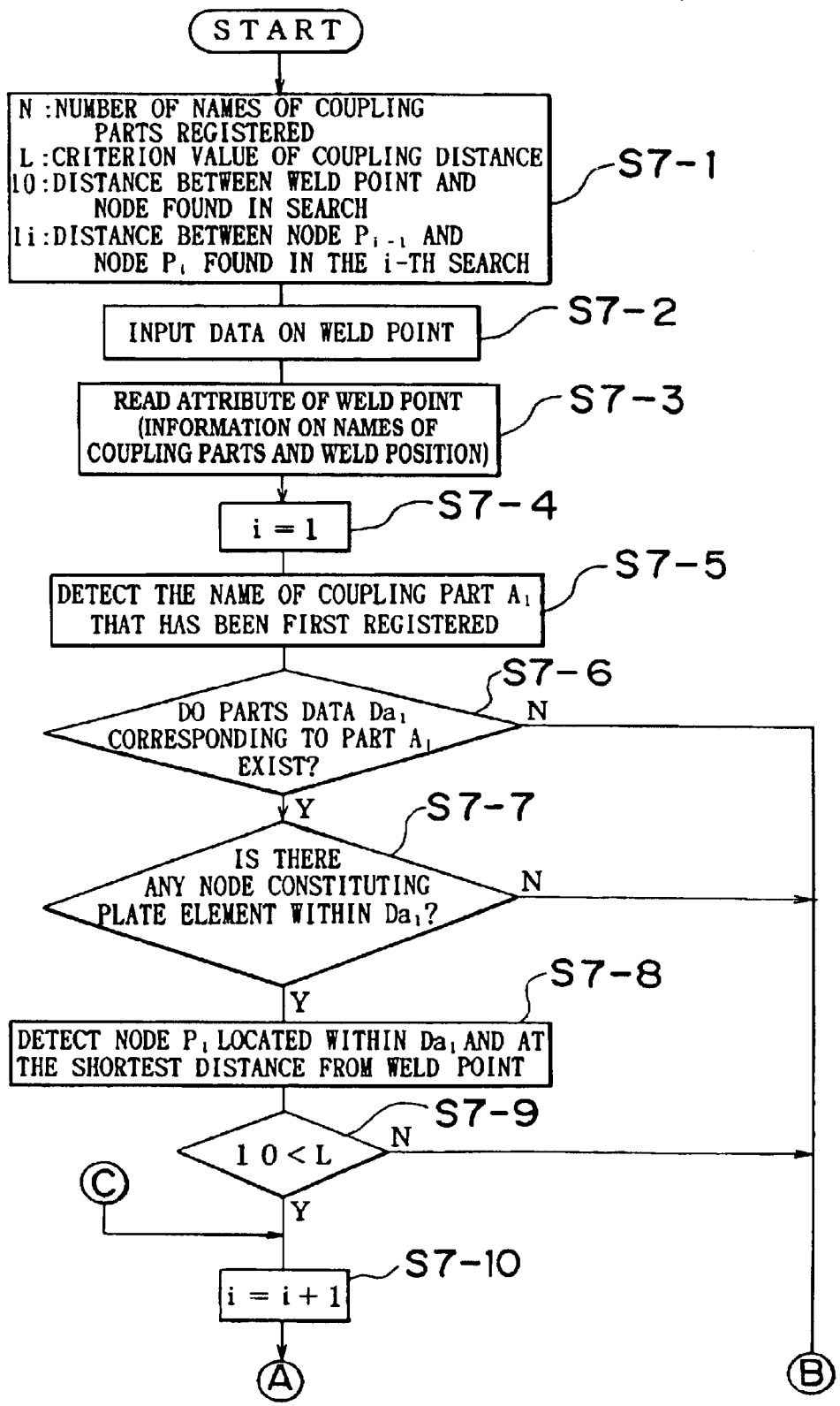
FIGS. 7 and 8 are flowcharts illustrating the operation of connecting nodes located close to the weld point as shown in FIG. 6.

The operation of constructing the CAD data for modeling a new part after a welding process by automatically generating finite elements for coupling parts will be described hereinafter in detail based on a flowchart. FIG. 7 illustrates the flowchart representing the operation of the CAD graphics system according to the second embodiment.

First of all, various variables are defined in step S7-1. In this flowchart, n represents the number of names of coupling parts registered. L represents a criterion threshold value of a coupling distance, which threshold value is used in searching a node located within the distance L from a weld point or the like. A distance between the node found in the search and the weld point is represented by $l_0$. $l_i$ represents a distance between a node $P_{i-1}$ found in the (i–1th) search and a node $P_i$ found in the i-th search.

In step S7-2, the data related to a weld point of concern are inputted. Out of the nodes located close to the given weld point, only those nodes which belong to a certain part are selected. The thus-selected nodes are integrated into one shared node or connected with one another via a two-dimensional finite element such as a coalescent element, a beam element or the like.

In step S7-3, the attributes of the weld point (the information on the names of coupling parts and the weld position) are read.

In step S7-4, 1 is substituted for a repetitious variable i.

In step S7-5, the name of the coupling part A1 that has been first registered in relation to the weld point is detected.

According to the example shown in FIG. 4, "PLATE A" is the name of the coupling part first registered in relation to the weld point 1. Thus, the value i=1 is read as the name of the coupling part A1.

In step S7-6, it is checked whether or not there are parts data Da1 corresponding to the thus-detected name of the coupling part A1. As has been described hereinbefore, the name of the coupling part A1 is, as it were, the name of a group, and it actually corresponds to the parts 20 and 30 and the like. Hence, it is checked whether or not the data Da1 on those actual parts are stored in the storage means. Unless such data exist in the storage means, the entire operation is terminated.

If the parts data Da1 exist in the storage means, it is checked in step S7-7 whether or not plate element-constituting nodes exist in those parts data Da1. In this step, it is checked whether or not there are any nodes to be integrated into one shared node or to be connected via a two-dimensional finite element.

In the case where desired nodes exist, a node P1 that is located in the data Da1 and at the shortest distance from the weld point is searched in step S7-8. The node P1 is located closest to the weld point.

In step S7-9, it is then checked whether or not the distance between the node P1 and the weld point is smaller than the criterion threshold value L. If the distance is greater than the criterion threshold value L, it is determined that there is no node located within the distance L from the weld point, and the entire operation is terminated. If the node P1 is located within the distance L from the weld point, the operation proceeds to step S7-10 and the repetitious variable i is incremented (+1).

Figure 8:
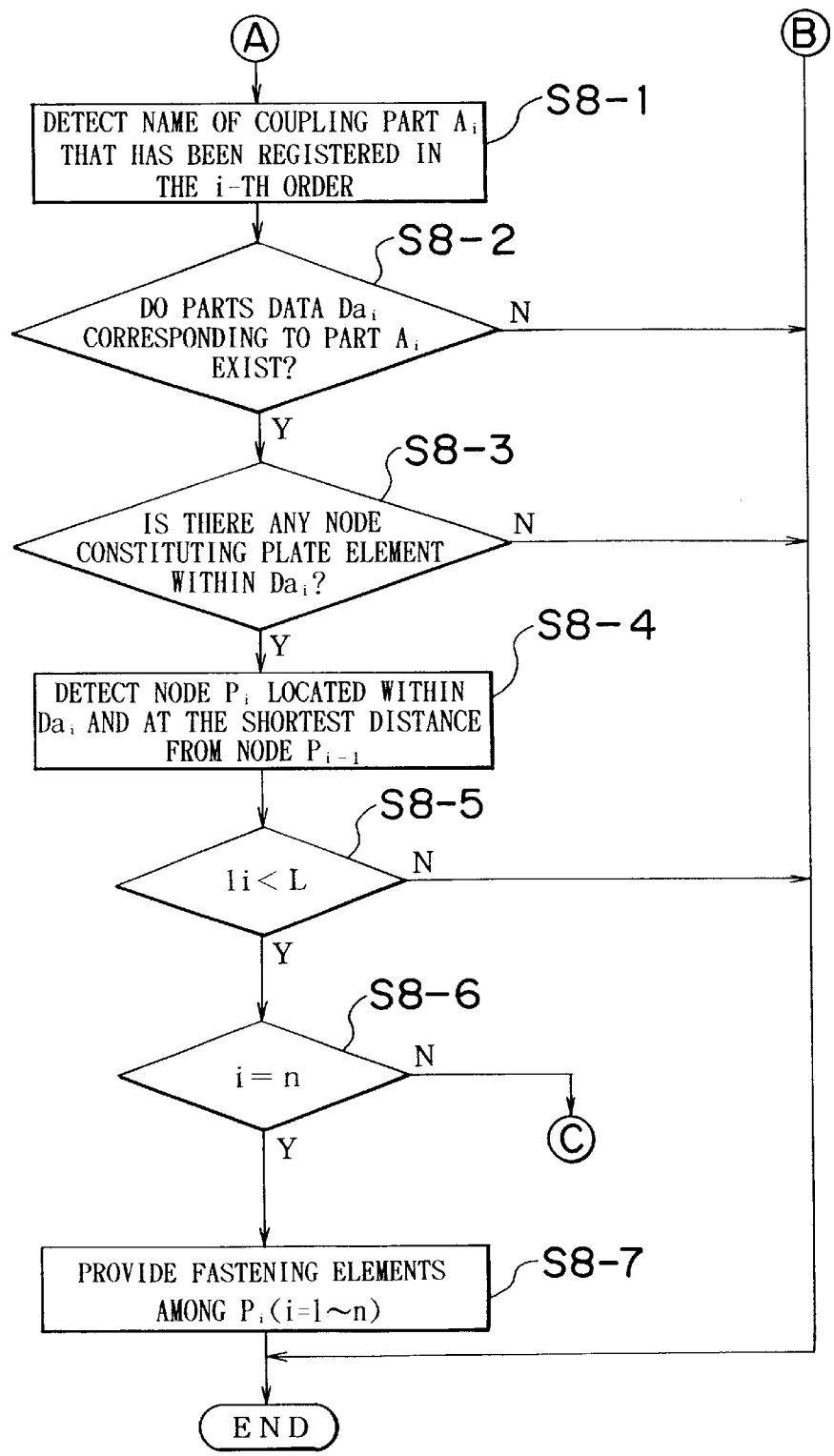
Figure 9:
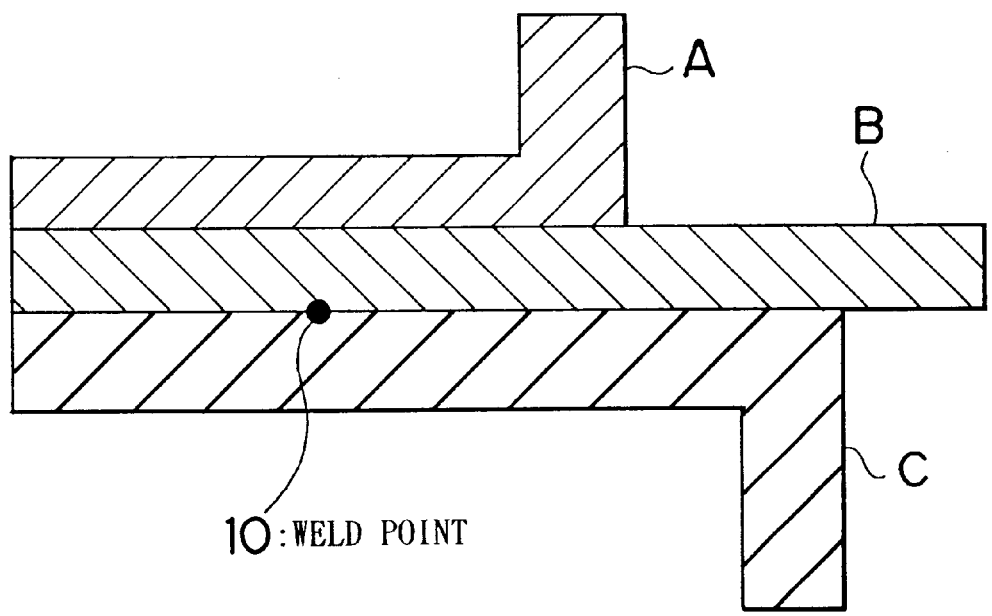
FIG. 9 is an explanatory view illustrating three plate parts having flanges and superimposed on one another.
Figure 10A:
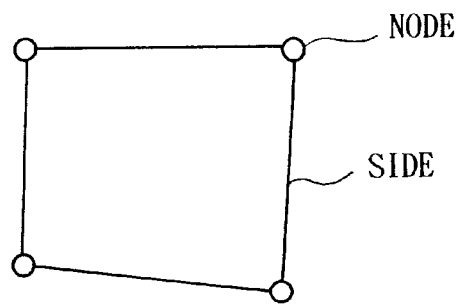
FIGS. 10A and 10B are explanatory views illustrating a difference in terminology between CAD and CAE.
Figure 10B:
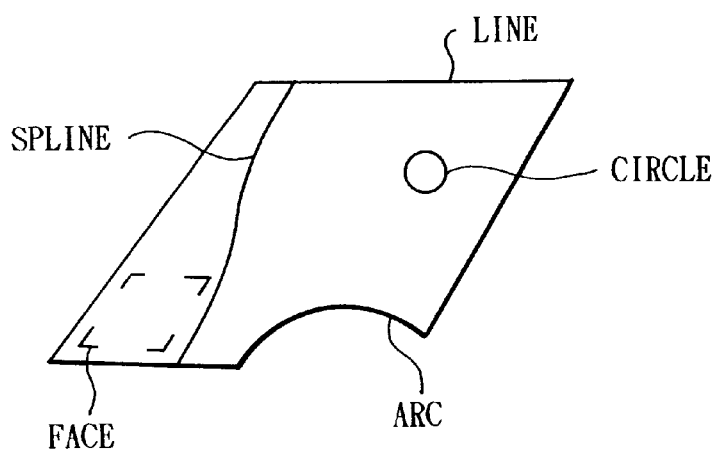

FIG. 8 is a flowchart showing the operation that follows step S7-10 of the flowchart in FIG. 7.

First of all, the name of the coupling part Ai that has been registered in the i-th order is detected in step S8-1. The variable i has been incremented in the aforementioned step S7-10. Therefore, when the operation goes through step S8-1 for the first time, the variable i assumes 2. Accordingly, the name of the coupling part A2 is detected.

The processing carried out in step S8-2 is similar to that carried out in step S7-6. However, while the processing in step S7-6 corresponds to the name of the coupling part A1, the processing in step S8-2 corresponds to the name of the coupling part $A_i$ (i assumes an integer equal to or greater than 2).

The processing carried out in step S8-3 is also similar to that carried out in step S7-7. However, the processing in step S8-3 corresponds to the parts data $Da_i$ (i assumes an integer equal to or greater than 2).

The processing carried out in step S8-4 is also substantially the same as that carried out in step S7-8. However, while the node $p_i$ located at the shortest distance from the weld point is searched in step S7-8, a node $P_i$ located at the shortest distance from the previously-found node $P_{i-1}$ in step S8-4. In step S8-5, it is then checked whether or not the distance $l_i$ between the node $P_i$ and the node $P_{i-1}$ is smaller than the threshold value L. If the distance $l_i$ is not smaller than L, the entire operation is terminated.

On the other hand, if the distance $l_i$ is smaller than L, it is checked whether or not the repetitious variable i has become equal to n (step S8-6). If the variable i is not equal to n, the operation proceeds again to the aforementioned step S7-10. Then, the variable i is incremented (+1) and the aforementioned processings are continued.

On the other hand, if the repetitious variable i is equal to n, the operation proceeds to step S8-7, where fastening elements are provided among the nodes $P_i$ obtained (i=1~n). More specifically, as has been described hereinbefore, finite elements such as spring elements, beam elements etc. are provided so as to connect the respective nodes with one another. Thereby, it becomes possible to construct a finite element model for coupling parts to be coupled at a weld point.

Although the aforementioned step S8-7 in FIG. 8 relates to an example in which fastening elements are provided, it is also preferable to displace those nodes so as to generate one shared node.

Thus, the second embodiment of the present invention makes it possible to automatically construct a finite element model that models coupling parts based on the data on parts to be coupled at a weld point. Consequently, it is possible to conduct structural analysis, strength analysis and the like with higher precision by utilizing the thus-obtained finite element model.

As has been described hitherto, the CAD graphics system according to the present invention is capable of imparting to a weld point the information on parts to be coupled at the weld point. In addition, a finite element model representing the coupling parts has been automatically constructed based on the data on the weld point, to which the information on parts to be coupled is imparted. Thus, it is possible to conduct strength analysis and the like with higher precision.

In particular, as regarding the information necessary for a welding robot, it is possible to integrate the information on the total thickness of a plate part with the information on the material constituting the plate part. Especially, if the information on the names of coupling parts is imparted to a system for driving the welding robot, even in the case where the thickness or material of the plate part has been changed in the course of a designing process, it is possible to automatically reflect the contents of design change upon the system with the aid of the names of the coupling parts.

First of all, the present invention has a specifying step in which the data on parts to be coupled at a coupling position are specified. Thus, according to a method of constructing the parts-coupling data as obtained from the present invention, the data on parts to be coupled can be designated with ease.

In the present invention, the coupling position to be designated is a position where spot welding is carried out. Accordingly, it is possible to easily designate parts to be coupled through welding.

In the present invention, a finite element model representing the entire set of coupling parts that have been coupled at the coupling position is automatically constructed. Accordingly, it is possible to automatically obtain the data useful for structural analysis and the like.

In the present invention, the nodes of the finite elements are connected via a two-dimensional finite element in constructing a finite element model. Accordingly, it is possible to easily provide finite elements.

In the present invention, the nodes of the finite elements are connected via a shared node. Accordingly, it is possible to easily construct a finite element model representing the entire set of the coupling parts.

In the present invention, the coordinate of a coupling point is specified to designate the coupling position. Accordingly, there is obtained a method of constructing the parts-coupling data, which method allows a coupling position to be designated with ease and precision.

Furthermore, a storage medium according to the present invention stores therein a program for realizing the method of the present invention. The storage medium achieves substantially the same effect as described hereinbefore.

Furthermore, the storage medium of the present invention relates to a system for implementing the method of the present invention, whereby substantially the same effect as described hereinbefore can be obtained.

In addition, those data which include the coordinate data according to the present invention are stored. Accordingly, it is possible to precisely read a coupling position from predetermined storage means.

In addition, according to the present invention, the coordinate data and the parts data are associated with each other. Therefore, it is possible to read both the data in association with each other.

While the present invention has been described with reference to what are presently considered to be preferred embodiments thereof, it is to be understood that the present invention is not limited to the disclosed embodiments or constructions. On the contrary, the present invention is intended to cover various modifications and equivalent arrangements. In addition, while the various elements of the disclosed invention are shown in various combinations and configurations, which are exemplary, other combinations and configurations, including more, less or only a single embodiment, are also within the spirit and scope of the present invention.

What is claimed is:

1. A system for constructing parts-coupling data, said system comprising:

a display to display parts to be coupled;

a pointing device associated with the display;

a memory storage device to store therein parts data to be coupled, said parts data being related to said parts to be coupled; and a system controller responsive to said pointing device and being operable in a designating mode and a specifying mode;

wherein said system controller causes said system to enter said designating mode of operation in which said pointing device is used for designating at least one coupling position where portions of said parts data are to be coupled, said at least one coupling position being designated on said display and the parts data within a predetermined distance from said at least one coupling position being automatically designated as second parts data; and wherein said system controller causes said system to enter said specifying mode of operation in which said pointing device is used to specify, from among the second parts data, said parts data to be coupled at said at least one coupling position so that part names associated with said parts data to be coupled are imparted to said at least one coupling position.

2. The system according to claim 1, wherein said coupling position represents a position where spot welding occurs.

3. The system according to claim 1, further comprising:

finite element model constructing means for constructing a finite element model that represents a set of coupling parts obtained as a result of coupling parts data after said parts to be coupled have been specified.

4. The system according to claim 3, wherein said finite element model constructing means includes connecting means for connecting nodes of finite elements of said coupling parts via a two-dimensional finite element such as a rigid-body element or a beam element.

5. The system according to claim 3, wherein said finite element model constructing means includes connecting means for connecting nodes of finite elements of said coupling parts via a shared node.

6. The system according to claim 1, wherein designating at least one coupling position includes coordinated designating means for designating a coordinate of a coupling point representing said coupling position.

7. The system according to claim 1, wherein the system controller specifies said parts data to be coupled at the coupling position based on connection information.

8. The system according to claim 7, wherein the connection information includes at least one appellation attribute, said appellation attribute including at least one of a name of a part, a line constituting a part and a surface of a part.

9. A computer readable storage medium storing therein a program code for operating a computer so as to cause it to couple parts data in a CAD system, the program comprising:
program control means for designating at least one coupling position where portions of parts data are to be coupled, wherein said at least one coupling position is designated on a display and the parts data within a predetermined distance from said at least one coupling position is automatically designated as second parts data; and
program control means for specifying, from among the second parts data, said parts data to be coupled at said at least one coupling position, and for imparting part names associated with said parts data to be coupled to said at least one coupling position.

10. A computer readable storage medium storing therein a program code according to claim 9, wherein said coupling position designated by said coupling position designating function corresponds to a position wherein spot welding occurs.

11. A computer readable storage medium storing therein a program code according to claim 9, further comprising program code means for constructing a finite element model that represents a set of coupling parts obtained as a result of coupling said parts data after the parts to be coupled have been specified by said coupling parts specifying program code means.

12. A program stored in the computer readable storage medium according to claim 11, wherein said finite element model constructing program code means includes means for connecting nodes of finite elements of said coupling parts via a two-dimensional finite element such as a rigid-body element or a beam element.

13. A program stored in the computer readable storage medium according to claim 11, wherein said finite element model constructing program means includes program code means for connecting nodes of finite elements of said coupling part via a shared node.

14. A program stored in the computer readable storage medium according to claim 9, wherein said coupling position designating program code means includes program code means for designating a coordinate of a coupling point representing said coupling position.

15. The program stored in the computer readable storage medium according to claim 9, wherein the program control means specifies said parts data to be coupled at the coupling position based on connection information.

16. The program stored in the computer readable storage medium according to claim 15, wherein the connection information includes at least one appellation attribute, said appellation attribute including at least one of a name of a part, a line constituting a part and a surface of a part.

17. A method of coupling parts data of at least two parts in a CAD system including at least a pointing device, said method comprising:
designating at least one coupling position where portions of parts data are to be coupled, wherein said at least one coupling position is designated on a display;
designating automatically as second parts data, the parts data within a predetermined distance from said at least one coupling position;
specifying from among the second parts data, said parts data to be coupled at said at least one coupling position; and
imparting to said at least one coupling position, part names associated with said parts data to be coupled.

18. The method according to claim 17, wherein said coupling position represents a position where spot welding is carried out.

19. The method according to claim 17, further comprising constructing a finite element model that represents a set of coupling parts obtained as a result of at least one iteration of said specifying step.

20. The method according to claim 19, wherein said finite element model includes connecting nodes for coupling said parts via a two-dimensional finite element such as a rigid-body element or a beam element.

21. The method according to claim 19, wherein said finite element model includes connecting means for connecting nodes of finite elements for coupling said parts via a shared node.

22. The method according to claim 17, further comprising designating coordinates of coupling points representing said coupling position.

23. The method according to claim 22, further comprising storing data corresponding to said parts being associated with coordinate data representing said coupling positions in a predetermined data storage device.

24. The method according to claim 23, wherein said data stored in said predetermined data storage device includes said coordinate data and data representing said parts, said coordinate data and said data representing said parts may be extracted in association with each other.

25. The method according to claim 17, wherein the parts data to be coupled at the coupling position are specified based on connection information.

26. The method according to claim 25, wherein the connection information includes at least one appellation attribute, said appellation attribute including at least one of a name of a part, a line constituting a part and a surface of a part.

27. A method for generating coupling parts information, said method comprising:
constructing data temporarily on a weld point;
determining whether an instruction exists to impart appellation attributes of coupling parts to said weld point;
inputting lines constituting parts to be coupled, if an instruction exists;
determining whether inputted lines have an appellation attribute;
determining whether information on names of coupling parts is included in the appellation attribute, if an instruction exists;
storing information on the names of coupling parts;
constructing data on the weld points;

determining whether the information on the names of coupling parts is stored; and imparting the stored information on the names of coupling parts to the weld point as an attribute.

28. A computer readable storage medium storing a program code therein for operating a computer so as to cause said computer to perform a method, said method comprising:

entering a designating mode;

designating a weld point;

constructing data temporarily on a weld point;

entering a specifying mode;

determining whether an instruction exists to impart appellation attributes of coupling parts to said weld point;

inputting lines constituting parts to be coupled, if an instruction exists;

determining whether inputted lines have an appellation attribute;

determining whether information on names of coupling parts is included in the appellation attribute, if an instruction exists;

storing information on the names of coupling parts;

constructing data on the weld points;

determining whether the information on the names of coupling parts is stored; and imparting the stored information on the names of coupling parts to the weld point as an attribute.

* * * * *